United States Patent
Bayley (10) Patent No.: US 6,539,242 B1
(45) Date of Patent: Mar. 25, 2003

(54) EFFICIENT DETECTION OF GENERAL PAGING MESSAGES IN POOR SIGNAL TO NOISE ENVIRONMENTS

(75) Inventor: Gwain Bayley, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/540,799

(22) Filed: Mar. 31, 2000

(51) Int. Cl.[7] ................................................. H04Q 7/20
(52) U.S. Cl. ..................... 455/574; 370/311; 455/343
(58) Field of Search ............................. 455/458, 574, 455/575, 504, 63, 343; 370/311, 312, 313, 346, 349, 338

(56) References Cited

U.S. PATENT DOCUMENTS

| | | | |
|---|---|---|---|
| 4,995,099 A | | 2/1991 | Davis |
| 5,392,287 A | | 2/1995 | Tiedemann, Jr. |
| 5,625,629 A | * | 4/1997 | Wenk ........................ 370/347 |
| 5,745,860 A | * | 4/1998 | Kallin ........................ 455/574 |
| 5,873,043 A | * | 2/1999 | Comer ........................ 455/458 |
| 6,157,816 A | * | 12/2000 | Anderson .................. 455/38.3 |
| 6,195,573 B1 | * | 2/2001 | Cassidy ....................... 455/574 |
| 6,240,304 B1 | * | 3/2001 | Blankenstein .............. 455/574 |

FOREIGN PATENT DOCUMENTS

| | | |
|---|---|---|
| EP | 0673175 | 3/1995 |
| WO | 9720446 | 6/1997 |

* cited by examiner

Primary Examiner—Thanh Cong Le
Assistant Examiner—Nick Corsaro
(74) Attorney, Agent, or Firm—Philip Wadsworth; Charles D. Brown; Howard Seo (57) ABSTRACT

A method of and an apparatus for reducing the average power consumption in a remote unit in a wireless communication system. When a remote unit in a slotted mode communication system enters an active state, it receives a sequence of messages. One element of this sequence is a general paging message that command the remote unit to return to the inactive state immediately, thus conserving battery power. The general paging message is followed by several additional elements in the sequence. When the remote unit operates in a poor signal-to-noise ratio environment, for example, it may not receive the general paging message and may, thus, unnecessarily remain in the active state until the end of its assigned slot, wasting battery power. The invention determines whether the element received by the remote unit is a general paging message. If so, the remote unit enters the inactive mode. If not, the invention determines whether the element occurs after a general paging message in the sequence of messages. If so, the remote unit enters the inactive mode without waiting for the end of the assigned slot.

18 Claims, 7 Drawing Sheets

EFFICIENT DETECTION OF GENERAL PAGING MESSAGES IN POOR SIGNAL TO NOISE ENVIRONMENTS

RELATED APPLICATIONS

The following U.S. Patent Application filed concurrently herewith, is elated to this application and hereby incorporated by reference in its entirety: DYNAMIC RECOGNITION OF AN EMPTY GENERAL PAGING MESSAGE

FIELD OF THE INVENTION

The invention relates to wireless communication systems. In particular, the invention relates to efficiently detecting a general paging message in a poor signal to noise environment by a remote unit in a wireless communication system.

BACKGROUND OF THE INVENTION

Figure 1:
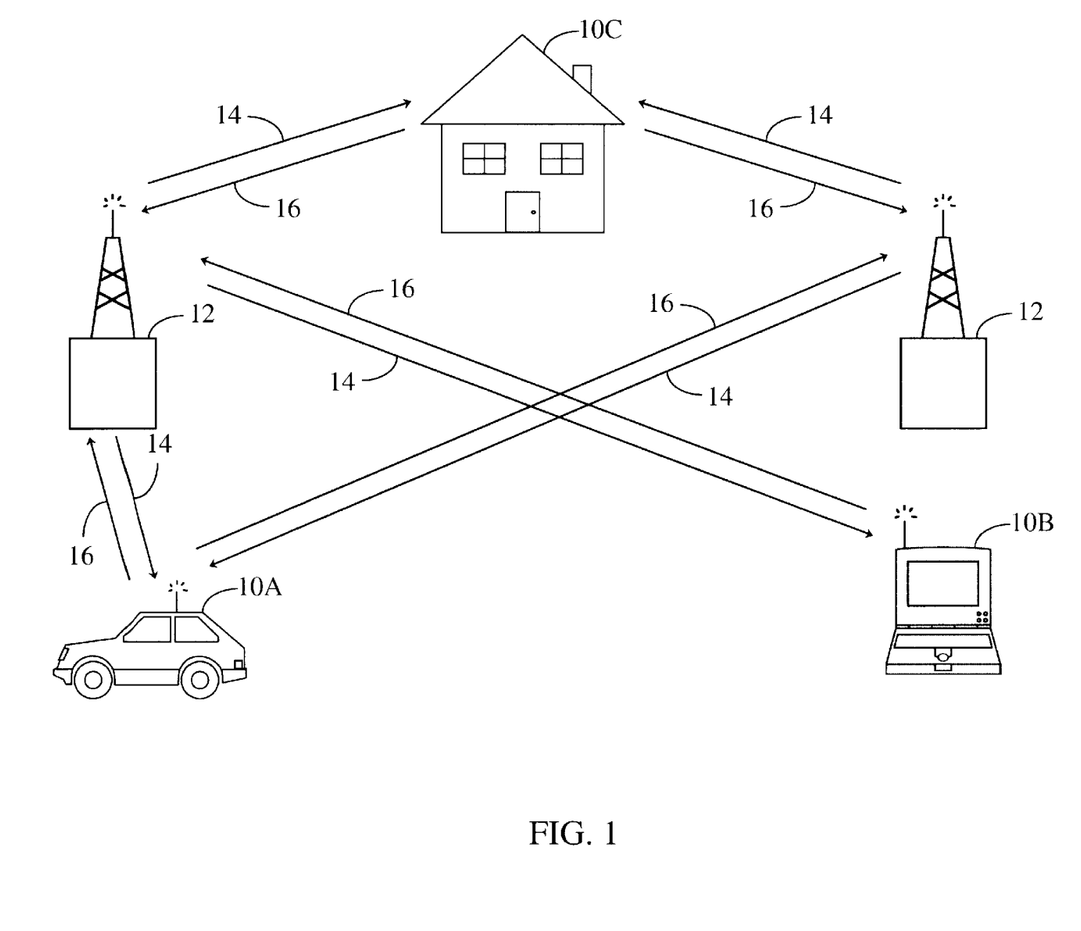
FIG. 1 is a representative diagram showing a typical modern wireless communication system.

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 11A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety.

Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it propagates between base stations and remote units. The multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example, if a sine wave is transmitted through a multipath channel having two paths where the first path has an attenuation factor of X dB, a time delay of $\delta$ with a phase shift of $\theta$ radians, and the second path has an attenuation factor of X dB, a time delay of $\delta$ with a phase shift of $\theta+\pi$ radians, no signal is received at the output of the channel because the two signals, being equal amplitude and opposite phase, cancel each other. Thus, fading may have a severe negative effect on the performance of a wireless communication system.

A CDMA communication system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of pilot signals from multiple base stations. Using a copy of the PN sequence produced by a local PN generator, the entire PN space can be searched by the remote unit. Using the search results, a controller in the remote unit distinguishes pilot signals from multiple base stations based on the time offset.

The controller is used to assign demodulation elements to the available multipath signal instances. A search engine is used to provide data to the controller concerning the multipath components of the received signal. The search engine measures the arrival time and amplitude of the multipath components of a pilot signal transmitted by the base stations. The effect of the multipath environment on the pilot signal and the data signal transmitted by a common base station is very similar because the signals travel through the same channel at the same time. Therefore, determining the multipath environment's affect on the pilot signal allows the controller to assign demodulation elements to the data channel multipath signal instances.

The search engine determines the multipath components of the pilot signals of base stations in the proximity of the remote unit by searching through a sequence of potential PN offsets and measuring the energy of the pilot signal received at each of the potential PN offsets. The controller evaluates the energy associated with a potential offset, and, if it exceeds a threshold, assigns a signal demodulation element to that offset. A method and apparatus of demodulation element assignment based on searcher energy levels is disclosed in U.S. Pat. No. 5,490,165 entitled DEMODULATION ELEMENT ASSIGNMENT IN A SYSTEM CAPABLE OF RECEIVING MULTIPLE SIGNALS, (the '165 patent) assigned to the assignee of the present invention.

Figure 2:
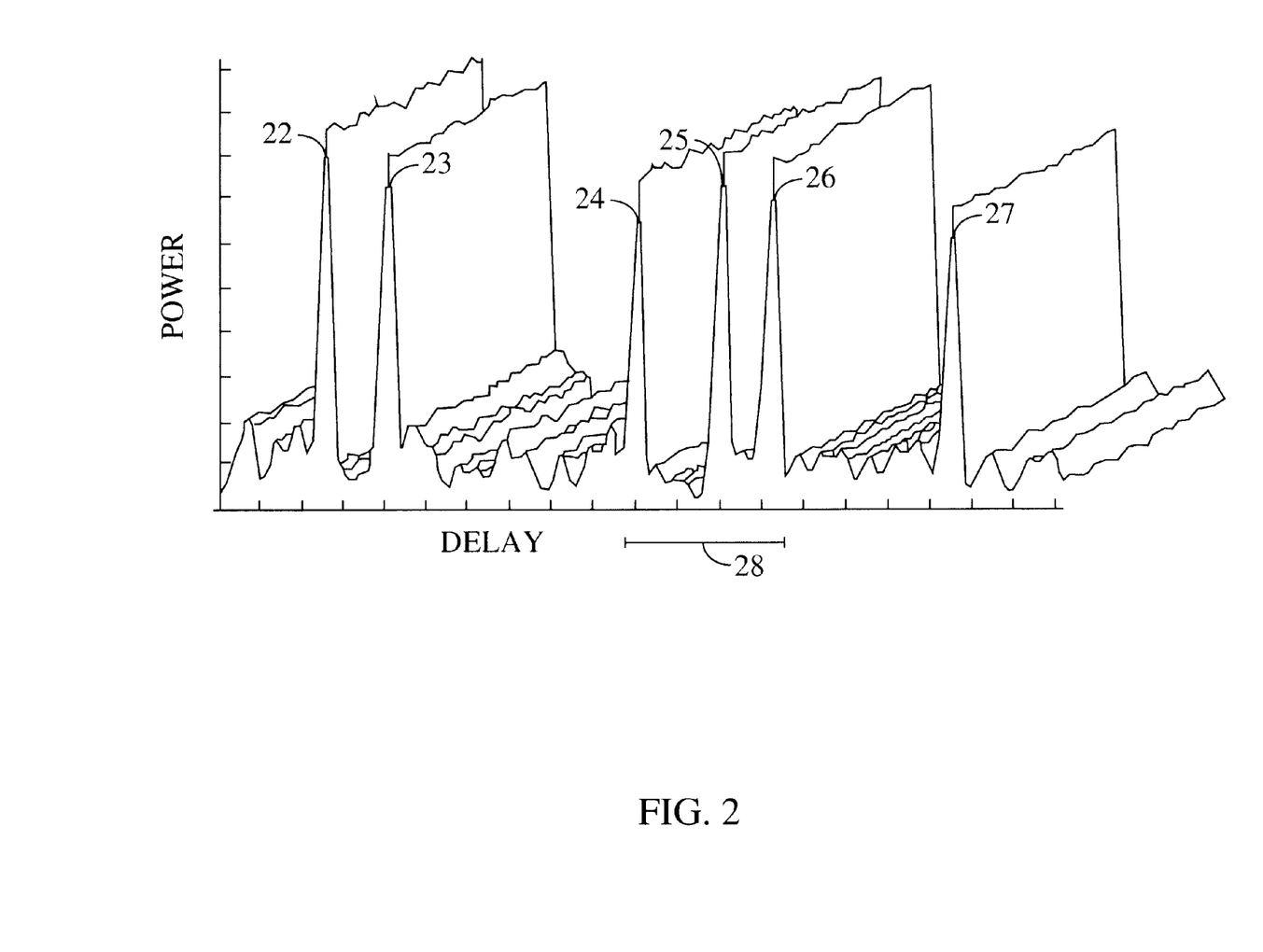
FIG. 2 is a graph showing an exemplifying set of multiple signal instances of a pilot signal from a single base station arriving at a remote unit.

FIG. 2 shows an exemplifying set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes 22–27 are representative of a severe multipath environment. A typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time.

Typically, the operation of the search engine is overseen by a controller. The controller commands the search engine to step through a set of offsets, called a search window, that is likely to contain one or more multipath signal peaks suitable for assignment to a demodulation element. For each offset, the search engine reports the energy it found offset back to the controller. Demodulation elements may then be assigned by the controller to the paths identified by the search engine (i.e. the timing reference of their PN generators is aligned with the timing of the identified path). Once a demodulation element has locked onto the signal, it then tracks that path on its own without controller supervision, until the path fades away or until the demodulation element is assigned to another path by the controller.

As noted above, each base station in a given geographical area is assigned a sequence offset of a common PN pilot sequence. For example, according to IS-95, a PN sequence having $2^{15}$ chips (i.e., one bit in the PN sequence) and repeating every 26.66 milliseconds (ms) is transmitted by each base station in the system at one of 512 PN sequence offsets as a pilot signal. According to IS-95 operation, the base stations continually transmit the pilot signal which can be used by the remote unit to identify the base station as well as other functions, such as for example, determining the multipath environment the remote unit is operating in and synchronization of remote unit timing to the base station timing.

During initial power on, or any other situation when the remote unit has lost a pilot signal such as when performing a hard hand-off to a different operating frequency, the remote unit evaluates all possible PN offsets of the pilot PN sequence. Typically, a search engine measures the pilot signal strength at all possible PN offsets, proceeding at a measurement rate that produces an accurate measure of the pilot signal present at the corresponding offset. Proceeding in this manner, the search engine determines the PN offset of base stations which are geographically near the remote unit. Searching each PN offset in this manner can take anywhere from hundreds of milliseconds to a few seconds depending on the channel conditions during acquisition. This amount of time for the remote unit to reacquire a pilot signal is detrimental to the remote unit operation, and may be annoying to the user of the remote unit.

Figure 3:
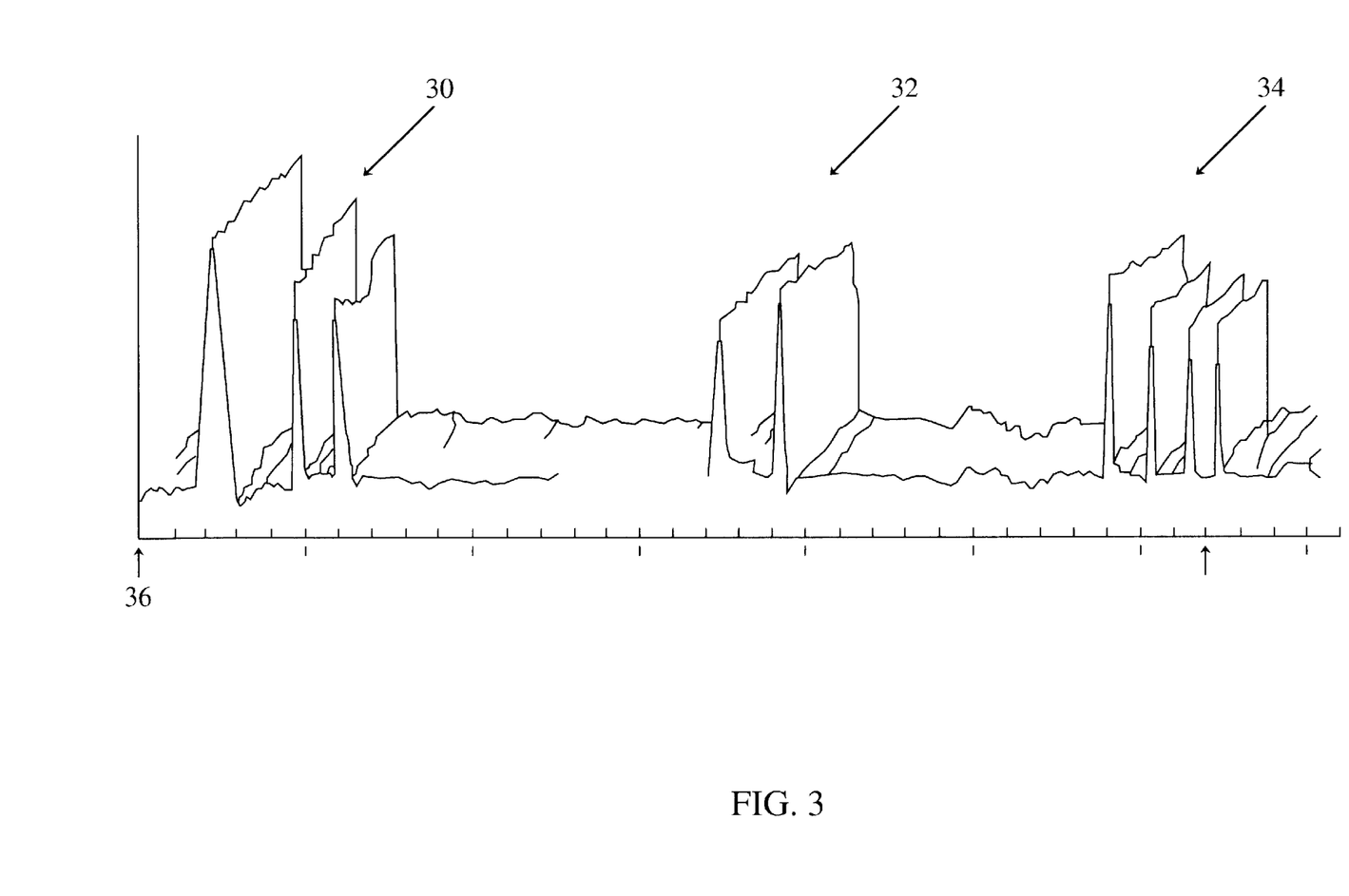
FIG. 3 is a graph showing an exemplifying set of multiple signal instances of pilot signals from multiple base stations arriving at a remote unit.

FIG. 3 shows an extended portion of PN space on the horizontal axis. The three groups of peaks 30, 32, 34 represent transmissions from three different base stations. As shown, the signal from each base station signal experiences a different multipath environment. Also, each base station has a different PN offset from the PN reference 36. Thus, the controller may select a set of PN offsets corresponding to search windows for any of the identified base stations. This allows the remote unit to simultaneously demodulate signals from multiple base stations by assigning demodulation elements appropriately.

In a typical CDMA communication system, remote units sporadically establish bidirectional communications with a base station. For example, a cellular telephone remains idle for significant periods of time when no call is in process. However, to ensure that any message directed to a remote unit is received, the remote unit continuously monitors the communication channel, even while it is idle. For example, while idle, the remote unit monitors the forward link channel from the base station to detect incoming calls. During such idle periods, the cellular telephone continues to consume power to sustain the elements necessary to monitor for signals from the base stations. Many remote units are portable and are powered by an internal battery. For example, personal communication system (PCS) handsets are almost exclusively battery-powered. The consumption of battery resources by the remote unit in idle mode decreases the battery resources available to the remote unit when a call is placed or received. Therefore, it is desirable to minimize power consumption in a remote unit in the idle state and thereby increase battery life.

One means of reducing remote unit power consumption in a communication system is disclosed in U.S. Pat. No. 5,392,287, entitled APPARATUS AND METHOD FOR REDUCING POWER CONSUMPTION IN A MOBILE COMMUNICATION RECEIVER (the '287 patent), assigned to the assignee of the present invention and hereby incorporated in its entirety herein by reference. In the '287 patent, a technique for reducing power consumption in a remote unit operating in an idle mode (i.e., a remote unit which is not engaged in bi-directional communication with a base station) is disclosed. In idle, each remote unit periodically enters an "active" state during which it prepares to and receives messages on a forward link communication channel. In the time period between successive active states, the remote unit enters an "inactive" state. During the remote unit's inactive state, the base station does not send any messages to that remote unit, although it may send messages to other remote units in the system that are in the active state.

As disclosed in the '287 patent, a base station broadcasts messages which are received by all remote units within the base station coverage area on a "paging channel." All idle remote units within the base station coverage area monitor the paging channel. The paging channel is divided in the time dimension into a continuous stream of "slots." Each remote unit operating in slotted mode monitors only specific slots which have been assigned to it as assigned slots. The paging channel continually transmits messages in numbered slots, repeating the slot sequence, such as for example, every 640 slots. When a remote unit enters the coverage area of a base station, or if a remote unit is initially powered on, it communicates its presence to a preferred base station. Typically the preferred base station is the base station which has the strongest pilot signal as measured by the remote unit.

The preferred base station, along with a plurality of geographically near neighboring base stations, assigns a slot, or a plurality of slots, within its respective paging channel, for the remote unit to monitor. The base station uses the slots in the paging channel to transmit control information to a remote unit, if necessary. The remote unit may also monitor a timing signal from the preferred base station allowing the remote unit to align, in the time dimension, to the base station slot timing. By aligning in the time dimension to the preferred base station slot timing, the remote unit can determine when a paging channel slot sequence begins. Thus, knowing when the paging channel slot sequence begins, which slots are assigned for it to monitor, the total number of slots in the repetitive paging channel sequence of slots, and the period of each slot, the remote unit is able to determine when its assigned slots occur.

Generally, the remote unit is in the inactive state while the base station is transmitting on the paging channel in slots which are not within the remote unit's assigned set. While in the inactive state, the remote unit does not monitor timing signals transmitted by the base station, maintaining slot timing using an internal clock source. Additionally, while in the inactive state the remote unit may remove power from selected circuitry such as, for example, circuits which monitor pilot signals transmitted by base stations to detect changes in the wireless channel, including the search engine. Using its internal timing, the remote unit transitions to its active state a short period of time before the next occurrence of an assigned slot.

When transitioning to the active state, the remote unit applies power to circuitry that monitors the wireless channel, including the search engine. The search engine is used to reacquire the preferred base station's pilot signal and to detect changes in the wireless channel which may have occurred due to the movement of the remote unit or to the movement of objects within the coverage area of the base station. In addition to reacquiring the pilot signal, the remote unit may perform any other actions or initializations in preparation of receiving a message at the beginning of its assigned slot.

When the remote unit enters the active state, it may receive messages in its assigned slots in the paging channel and respond to commands from the base station. For example, the remote unit may be commanded to activate a "traffic" channel to establish a bi-directional communication link for conducting subsequent voice communication in response to an incoming call. If there is no message from the base station, or no command requesting the remote unit to remain active, at the end of the assigned slot the remote unit returns to the inactive state. In addition, the remote unit returns to the inactive state immediately if commanded to do so by the base station.

During its assigned slot, the remote unit's search engine measures the pilot signal strength of the preferred base station as well as the pilot signal strengths of neighboring base stations. If the remote unit relocates from the coverage area of one base station to another neighboring base station's coverage area, the remote unit needs to "hand-off" to the neighboring base station. A hand-off occurs when the transmitted pilot signal strength of a neighbor base station becomes sufficiently stronger than the preferred base station. When this occurs, the neighboring base station is assigned as the preferred base station. Following a hand-off, in the next active state, the remote unit monitors the paging channel of the new preferred base station to receive messages and commands.

In addition to providing data for determining when a hand-off should occur, searches of the preferred base station's pilot signal allow the remote unit to make adjustments to compensate for changes in the multipath environment. For example, if one of the multipath signal instances weakens to the point that it is unusable, the remote unit may reassign demodulation elements accordingly.

Knowing the nominal PN offset of the preferred base station as well as a neighboring set of base stations, typically, the controller passes a set of search parameters to the search engine specifying PN offsets at which multipath signal instances of pilot signals are likely to be found. At the completion of the search, the search engine passes the search results to the controller. The controller analyzes the search results and selects a set of search parameters for the next search. Following selection of the new search parameters, the controller passes the parameters to the search engine and the search process is repeated. This process is repeated until the remote unit once again enters the inactive idle state.

During the assigned slot, the base station sends a general paging message as well as other message types. The general paging message carries information such as whether all messages directed to remote units operating in the slotted mode and active in the current slot have been sent by the end of this general paging message, whether all broadcast messages have been sent by the end of the current general paging message, the class of remote units which are being addressed, service option requests directed to a specific remote unit and other messages such as those described in IS-95.

When no more remote unit-specific or broadcast messages are available for the assigned slot time, the base station sends an empty general paging message. Upon receipt of the empty general paging message, the remote units simply return to the inactive state.

A problem can occur when a remote unit operating at a low signal-to-noise ratio is unable to receive a portion of the messages sent over the paging channel. For example, if a remote unit operating in a poor signal-to-noise ratio environment enters the active state during an assigned slot, it may not properly receive the general paging message, and it may remain in the active state until the completion of the current slot.

As noted above, the remote unit requires less power in the inactive state. Thus, it is advantageous for the remote unit to spend as much time in the inactive state as possible. If the remote unit does not properly receive the empty general paging message, it unnecessarily remains in the active state until the end of the current slot, thus consuming resources during a period in which no message will be sent to the remote unit. Therefore, there is a need in the art to reduce the consumption of power of a remote unit operating in slotted mode by entering the inactive state as soon as possible even in poor signal-to-noise environments.

SUMMARY OF THE INVENTION

The invention is directed to methods of and an apparatus for detecting general paging messages. In an aspect of the present invention, the invention can be used for reducing the average power consumption of a remote unit even in a poor signal-to-noise ratio environment. In a slotted mode communication system, a remote unit will alternate between active and inactive states. When the remote unit is in its active state it monitors the wireless channel and receives messages from a base station. At the completion of its active state, either when commanded by the base station or reaching the end of its assigned slot, the remote unit enters an inactive state. During the inactive state the remote unit reduces power consumption by removing power from selected circuitry, such as, for example, circuitry used to monitor the wireless channel.

A method of processing base station signals by a remote unit according to one aspect of the present invention includes transmitting a sequence of messages from a base station; receiving an element of the sequence by the remote unit; determining whether the element is a general paging message; and, if the element is not a general paging message, further determining whether the element occurs after a general paging message in the sequence.

According to another aspect of the invention, the method further includes transitioning the remote unit to an inactive mode when the element is a general paging message. According to yet another aspect of the invention, the method further includes transitioning the remote unit to an inactive mode when the element occurs after a general paging message in the sequence.

A remote unit according to an aspect of the invention includes a receiver configured to receive an element of a sequence of messages transmitted by a base station; and a controller configured to determine whether the element is a general paging message and further configured to determine, when the element is not a general paging message, whether the element occurs after a general paging message in the sequence.

According to another aspect of the invention, the controller is further configured to transition the remote unit to an inactive mode when the element is a general paging message. According to yet another aspect of the invention, the controller is further configured to transition the remote unit to an inactive mode when the element occurs after a general paging message in the sequence.

BRIEF DESCRIPTION OF THE DRAWINGS

The features, objects and advantages of the present invention will become more apparent from the detailed description set forth below when taken in conjunction with the drawings in which like references characters identify correspondingly throughout, and wherein.

DETAILED DESCRIPTION OF THE INVENTION

Figure 4:
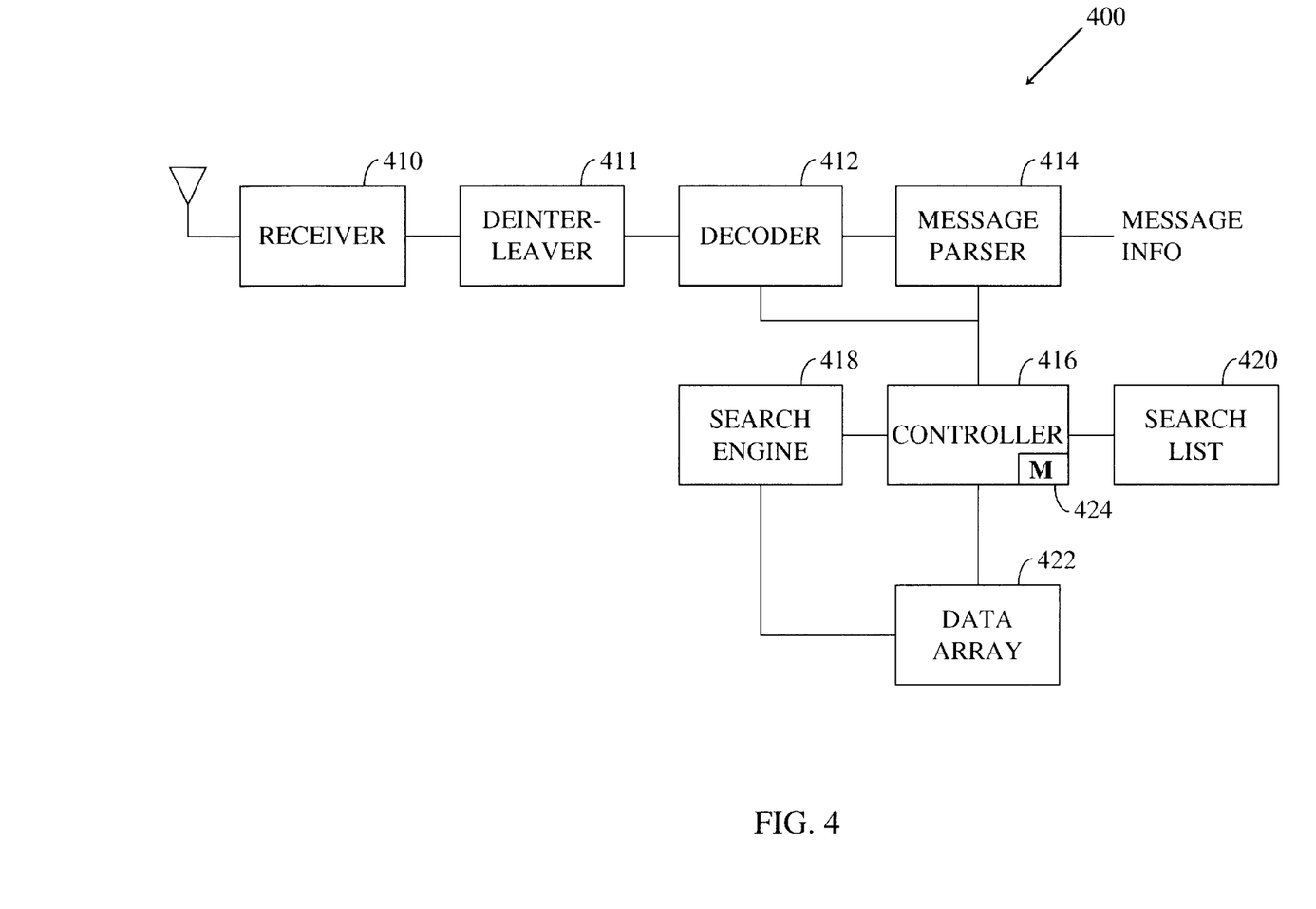
FIG. 4 is a block diagram of an embodiment of a remote unit according to the principles of the present invention.

FIG. 4 is a block diagram of a remote unit 400 according to an embodiment of the present invention. A receiver 410 receives wireless link signals including the paging channel messages. The receiver 410 provides for reception and down-conversion of the wireless link signal and also provides despreading in a CDMA environment, as well as other demodulation functions. The receiver 410 provides a series of digital values at its output digital.

According to well-known wireless link protocols, such as IS-95, before data is transmitted over the wireless link, it is divided into a series of blocks. The blocks are reordered in time such that the block order is non-time sequential as transmitted over the wireless link. This method of transmitting blocks is referred to as interleaving, and the process of reordering the blocks is referred to as deinterleaving. A deinterleaver 411 performs the deinterleaving function. The deinterleaver 411 receives samples from the receiver 410 and accumulates a series of blocks data. When an entire set of blocks has been received, the deinterleaver 411 reorders the blocks in time-sequential order and outputs them to a decoder and error detection module 412.

In one embodiment, the decoder 412 is a convolutional decoder. One common form of convolutional decoder is the Virterbi decoder. A Virterbi decoder creates soft decision data based upon groups of data.

The decoder and error detection module 412 decodes the data bits and provides error detection, for example, in the form of erasures. Erasures occur when the digital data is not properly received by the decoder. A Virterbi decoder, for example, provides error detection and handling of the erasure by determining the highest probability decision data.

When the decoder buffer contains sufficient data, the data is passed to a message parser 414. The message parser 414 performs such functions as collection of bits in the message, computing and verifying any cyclic redundancy code (CRC) or other error checking code, translation of the message into an internal format, copying the transformed message into a buffer, and placement of the transformed message onto a queue for the proper protocol task. The message is evaluated field-by-field. In general the processes of the decoder 412 and the message parser 414 are controlled by a controller 416.

The controller 416, in addition to controlling the decoder 412 and the message parser 414, is also in communication with a search list 420 stored in a memory, such as for example, a RAM or a portion of an Application Specific Integrated Circuit (ASIC) or other suitable electronic storage. In addition, the controller 416 is in communication with a search engine 418. The controller 416 can pass search parameters to the search engine 418. The search engine 418 is in communication with a data array 422 and can store search results in the data array 422. The data array can be located in a memory. The controller 416 is also in communication with the data array 422, thereby providing the controller 416 access to the search results stored therein. In one embodiment, the controller 416 is a microprocessor. The controller 416 may be an ASIC, a Field Programmable Gate Array (FPGA), discrete logic, analog circuitry, or other control circuitry. Both the controller 416 and the search engine 418 can be fabricated on the same ASIC. Additionally, the search list 420 and the data array 422 can be included on the same or a different ASIC. The configuration of the hardware in the remote unit 400 may be controlled through firmware, allowing field upgrade of a remote unit by downloading new firmware.

A message monitor 424 can be located within the controller. The message monitor 424 provides for examination of the received messages. The message monitor 424 determines whether the received message occurs after an empty general paging message in a sequence of messages received during an assigned slot. The message monitor 424 may be a hard-wired list of message types corresponding to the sequence of the received messages. Alternatively, the message monitor 424 may be a list of message types corresponding to message types occurring after an empty general paging message. The message monitor 424 can be implemented as software or firmware running on the controller 416 or can be implemented as hardware. The operation of the message monitor 424 is discussed in more detail below.

In general, operation of the remote unit 400 is controlled by configuration of the hardware and software executed on the controller 416. The hardware configuration may be established by firmware, software, hardwiring of discrete devices or any combination of the above.

Figure 5:
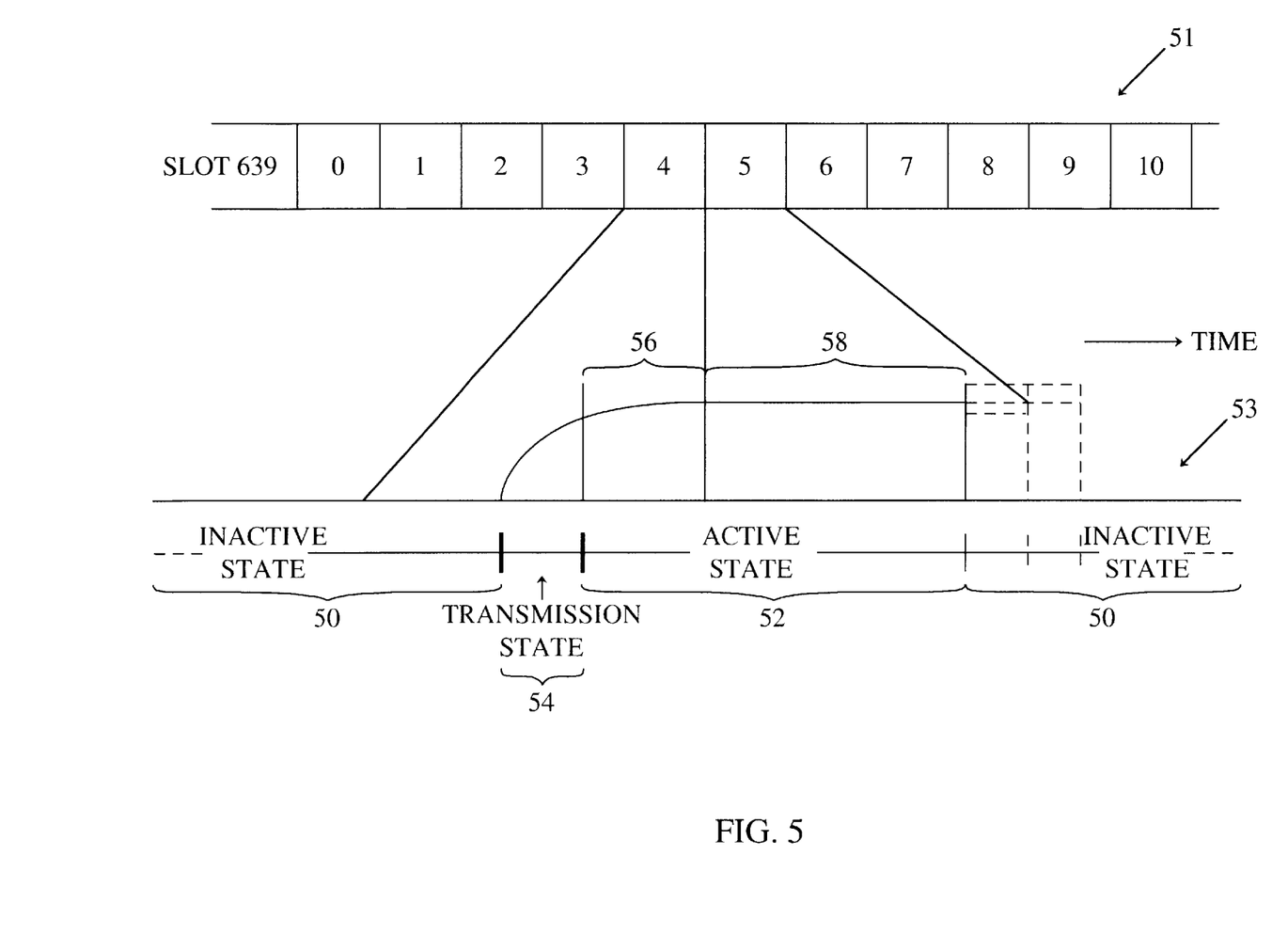
FIG. 5 is a representative diagram illustrating the transition from the inactive state to the active state at the assigned slot of a remote unit in a slotted mode communication system.

FIG. 5 is a representative diagram illustrating the transition from the inactive state to the active state at the assigned slot of a remote unit in a slotted mode communication system, such as the remote unit 400 depicted in FIG. 4. FIG. 5 shows a time line presented in two separate portions. An upper portion 51 represents the continual sequence of slots which flow in time from left to right. The lower portion 53 represents events occurring during a transition between active and inactive states of a remote unit in a slotted mode communication system in which slot 5 is an assigned slot. The time scale for the lower portion has been expanded so that the transition can be shown in more detail.

In particular, the lower portion 53 of FIG. 5 shows the transition from an inactive state 50 to an active state 52. In the active state 52, the remote unit monitors the base station signal during at least a portion of slot 5. Prior to the start of slot 5, the remote unit transitions from the inactive state 50 to the active state 52 through a transition state 54. As described above, in the inactive state 50, selected circuitry in the remote unit is unpowered, reducing power consumption and extending battery life of the remote unit. For example, power may be removed from the search engine during the inactive state 50.

During the transition state 54, power is reapplied to the selected circuitry of the remote unit. For example, if the search engine 418 is unpowered, power is reapplied to the search engine 418 in the transition state 54. The duration of the transition state 54 is sufficient to allow the remote unit to power on circuits and initialize functions so that the remote unit is functional, allowing it to perform searches at the end of the transition state 54.

Following the transition state 54, the remote unit enters the active state 52. The active state 52 is made up of two parts: a preparation period 56 and an assigned slot period 58. During the preparation period 56, an initial search is performed reacquiring the pilot signal of the preferred base station so that the remote unit is prepared to monitor the paging channel during the assigned slot period 58. The beginning of the assigned slot period 58 coincides with the beginning of slot 5.

In one embodiment, the remote unit begins general searching for pilot signals from neighboring base stations only after entering the assigned slot period 58. In another embodiment, general searching for pilot signals from neighboring base stations begins while the remote unit is still in the preparation period 56, immediately following reacquisition and alignment with the preferred base station. During general searching, the remote unit can continue to measure the pilot signal strength of the preferred base station.

During the assigned slot period 58, the remote unit receives messages on the paging channel from the preferred base station. Nominally, at the completion of slot 5, the assigned slot period 58 and the active state 52 terminate and the remote unit enters the inactive state 50. In order to further reduce the power consumption of the remote unit, the base station may command the remote unit to enter the inactive state 50 before the completion of slot 5. Alternatively, if the base station cannot complete the transfer of messages during slot 5, the base station may command the remote unit to remain in the assigned slot period 58 after the completion of the slot. 5. Subsequently, the base station commands the remote unit to enter the inactive state 50. Searching terminates upon entering the inactive state 50 and power can be removed from the search engine.

During an assigned slot, the base station sends a sequence of messages. The first message type that the base station sends, for example, according to IS-95, is remote unit-directed messages corresponding to remote units operating in the slotted mode. As described in IS-95, directed messages include abbreviated alert orders, off indication challenge messages, base station acknowledgment orders and registration acceptance orders as well as others. In general, the directed messages contain information corresponding to a single remote unit. Following the directed messages, the remote unit sends a general paging message. The general paging message carries information such as whether all messages directed to remote units operating in a slotted mode and active in the current slot have been sent, whether all broadcast messages have been sent, and the class of remote units which are being addressed. The general paging message can also carry broadcast information as well as service option requests directed to a specific mobile unit.

After one or more general paging messages, the remote unit sends an empty general paging message indicating that the remote unit operating in slotted mode may enter the inactive state unless previously instructed to the contrary by the base station.

Following the empty general paging message, the base stations may send a series of overhead messages. The overhead messages include the access parameter message, CDMA channel list message, neighborless message and system parameters message as well as others described in IS-95. In addition, following the empty general paging message, the base station may send a series of directed messages intended for receipt by remote units which are not operating in a slotted mode. For example, some remote units in the system may monitor the paging channel continually rather than cycling through a series of active and inactive states.

After completion of the overhead messages, if additional time remains in the current time slot, the base station sends a series of null messages.

Figure 6:
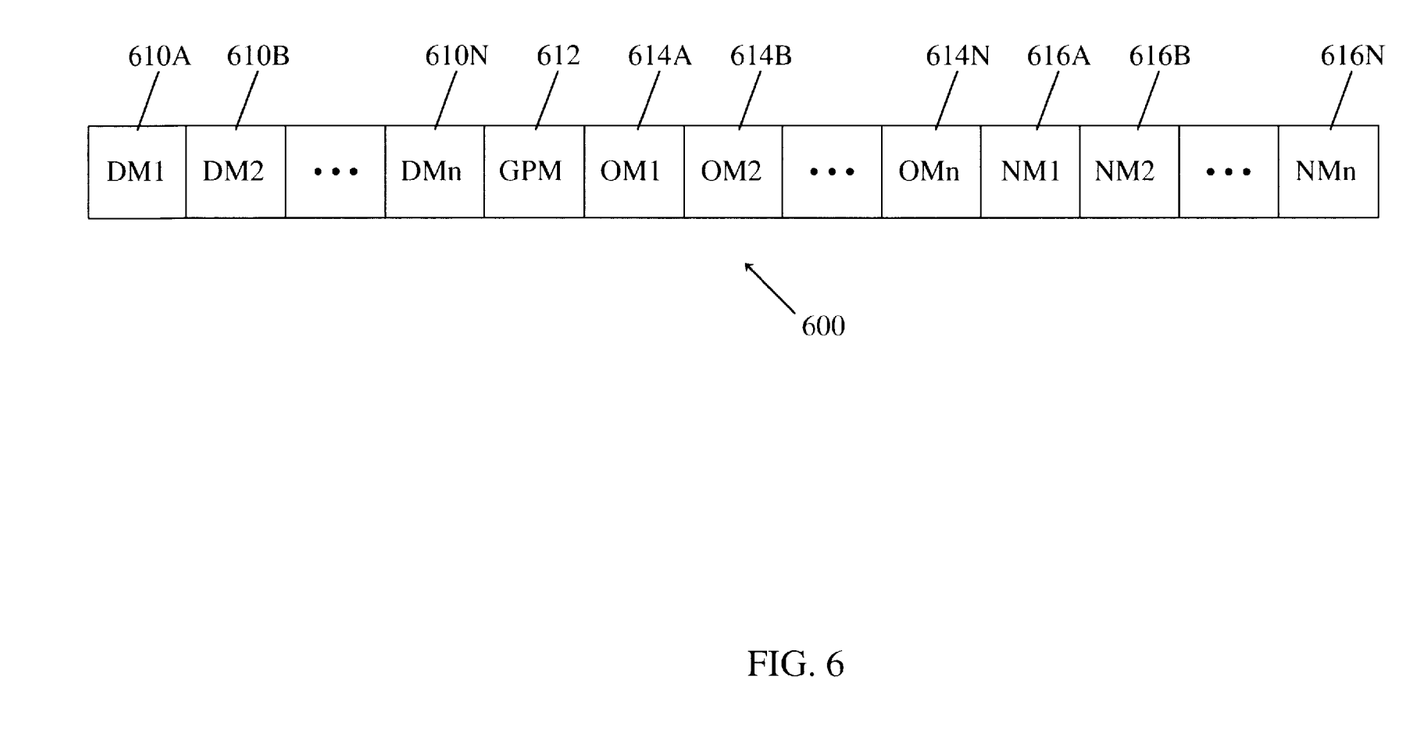
FIG. 6 is a representative diagram illustrates the typical paging channel transmissions from a base station.

As described above, the base station sends this sequence of messages during an assigned slot. FIG. 6 illustrates a typical paging channel transmission sequence 600 from a base station. The sequence 600 comprises several sets of elements transmitted by the base station. As shown in FIG. 6, the base station first sends a series of directed messages 610A–N to remote units operating in slotted mode. Following the directed messages 610A–N, the base station sends a general paging message 612. Alternatively, more than one general paging message may be sent. The general paging message 612, or the last general paging message if more than one is sent, commands or instructs the remote units in slotted mode to enter the inactive state unless previously commanded by the base station to the contrary. Following the empty general paging messages 612, the base station sends a series of overhead messages 614A–N. Following the overhead messages 614A–N, the base station sends a series of null messages 616A–N to fill the remainder of the slot. Thus, overhead messages 614A–N and null messages 616A–N only occur after a general paging message or, if more than one, the last general paging message, in the sequence of messages received during the assigned slot.

When a remote unit is operating in an environment in which its ability to properly receive the paging channel is diminished as in, for example, a poor signal-to-noise environment, the decoder and error detection module 412 of FIG. 4, for example, discards data which is not properly received. When data with such erasures is passed to, for example, the message parser 414, all of the elements in the sequence of messages may not be generated or received. For example, the general paging message may not be properly generated.

Referring again to FIG. 6, a remote unit operating in a poor signal-to-noise ratio environment may receive the directed messages 610A–N, but may be unable to receive the empty general paging message 612. The remote unit would continue to monitor the overhead messages 614A–N and the null message 616A–N until the end of the assigned slot. Unless otherwise commanded to the contrary by the base station, the remote unit would enter an inactive state at the end of the assigned slot. In such a case, the remote unit remains in the active state unnecessarily to receive the messages which follow the empty general paging message 612, thus unnecessarily consuming battery power. Thus, by monitoring for overhead messages 614A–N and null messages 616A–N, the present invention can safely enter an inactive mode without waiting for the end of the assigned slot.

Figure 7:
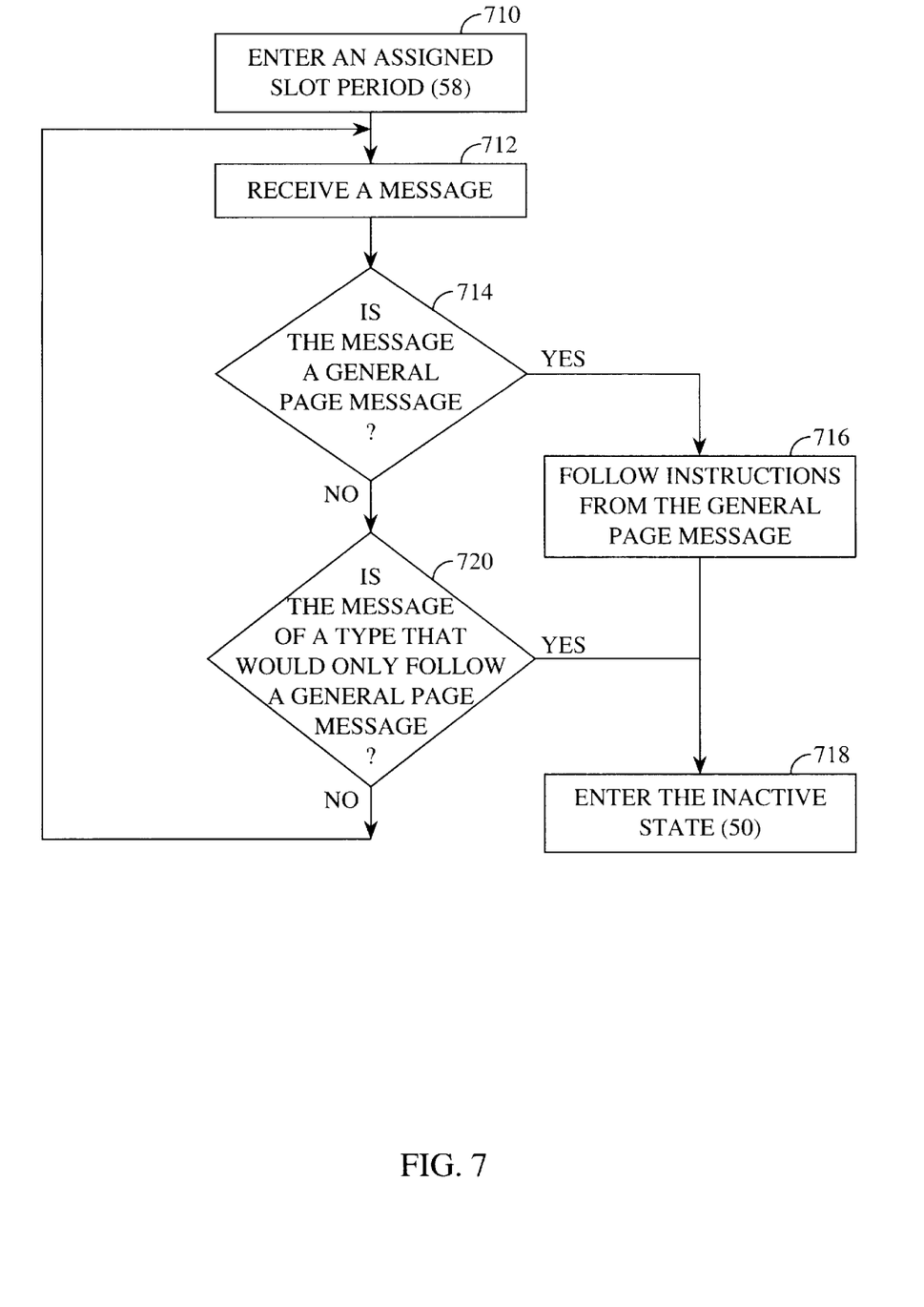
FIG. 7 is a flow chart illustrating the method of operation of one embodiment of the invention.

FIG. 7 is a flowchart showing operation of a remote unit in accordance with the present invention. In block 710, a remote unit enters the assigned slot period 58 shown in FIG. 5. In block 712, the remote unit receives a message. For example, the message parser 414, shown in FIG. 4, produces information corresponding to one of the messages shown in FIG. 6. In block 714, the remote unit determines whether the message is an empty general paging message or other general paging message which commands the remote unit to enter the inactive state 50. Referring to FIG. 4, for example, the message parser 414 forwards the message to the controller 416. The controller 416 compares the message with, for example, information stored in a memory to determine whether it is a general paging message, directed message or other message type.

If the message is an empty general paging message or other message which commands the remote unit to enter the inactive state 50, flow continues to block 716 where the remote unit follows the instructions in the general paging message. In block 718, after completing the instructions from the general paging message, the remote unit enters the inactive state 50.

Referring again to block 714, if the message is not a general paging message, flow continues to block 720. In block 720, the remote unit determines whether the message was of the type that would only follow a general paging message. For example, as described above with reference to FIG. 4, the message monitor 422 examines the message information to determine whether the message was an overhead message or null message. If the message monitor determines that the message information corresponds to a message type that would only follow a general paging message, the remote unit can assume that the final general paging message has been sent by the base station and, thus, any additional messages transmitted in the assigned slot will not be pertinent to the remote unit. Therefore, if the message is of a type that would only follow a general paging message, flow continues to block 718 and the remote unit enters the inactive state 50.

Referring again to block 720, if the message is of a type that might be transmitted before the general paging message, flow continues to block 712.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. Nos. 5,867,527 and 5,710,768, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,654,979, entitled CELL SITE DEMODULATION ARCHITECTURE FOR A

SPREAD SPECTRUM MULTIPLE ACCESS COMMUNICATION SYSTEMS;

(7) application Ser. No. 08/987,172, entitled MULTI CHANNEL DEMODULATOR, filed on Dec. 9, 1997; and (8) application Ser. No. 09/283,010, entitled PROGRAMMABLE MATCHED FILTER SEARCHER, filed on Mar. 31, 1999;

each of which is assigned to the assignee hereof and incorporated herein by reference, in its entirety.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for use by a remote unit in a wireless communication system for processing base station signals, comprising:
    receiving an element of a sequence of messages during a slot assigned to the remote unit, the sequence of messages including a general paging message for transitioning a mode of operation of the remote unit to an inactive mode;
    determining whether said element is the general paging message;
    if said element is not the general paging message, further determining whether said element is of a type that only occurs after the general paging message during the slot; and
    changing the mode of operation of said remote unit to the inactive mode when said element is of the type that only occurs after the general paging message.

2. The method according to claim 1, wherein said remote unit transitions to an active mode prior to said receiving.

3. The method according to claim 1, further comprising:
    changing a mode of operation of said remote unit when said element is a general paging message.

4. The method according to claim 1, further comprising:
    transitioning said remote unit to an inactive mode when said element is a general paging message.

5. The method according to claim 1, further comprising:
    transitioning said remote unit to an inactive mode when said element is of the type that only occurs after a general paging message.

6. A remote unit for use in a communication system, comprising:
    a receiver configured to receive an element of a sequence of messages during a slot assigned to the remote unit, the sequence of messages including a general paging message for transitioning a mode of operation of the remote unit to an inactive mode; and
    a controller configured to determine whether said element is the general paging message and further configured to determine, when said element is not the general paging message, whether said element is of the type that only occurs after the general paging message in said sequence,
    wherein said controller is further configured to transition said remote unit to an inactive mode when said element is of the type that only occurs after the general paging message.

7. The remote unit according to claim 6, wherein said controller is further configured to transition said remote unit to an inactive mode when said element is a general paging message.

8. A remote unit for use in a communication system, comprising:
    a receiver configured to receive an element of a sequence of messages in interleaved form during a slot assigned to the remote unit, the sequence of messages including a general paging message for transitioning a mode of operation of the remote unit to an inactive mode, said sequence being of a fixed order of element types;
    a deinterleaver coupled with said receiver and configured to deinterleave said element received in interleaved form;
    a controller configured to determine whether said element is the general paging message; and
    a message monitor configured to determine, when said element is not the general paging message, whether said element is of a type occurring only after the general paging message in said sequence,
    wherein said controller is further configured to transition said remote unit to an inactive mode when said element is the type that occurs only after the general paging message.

9. The remote unit according to claim 8, wherein said controller is further configured to transition said remote unit to an inactive mode when said element is a general paging message.

10. The remote unit according to claim 8, wherein said message monitor is part of said controller.

11. A remote unit for use in a communication system with base stations transmitting a sequence of messages in interleaved form, said sequence being of a fixed order of element types, said remote unit comprising:
    a receiver configured to receive an element of said sequence during a slot assigned to the remote unit, the sequence of messages including a general paging message for transitioning a mode of operation of the remote unit to an inactive mode;
    a deinterleaver coupled with said receiver and configured to deinterleave said element received in interleaved form; and
    a controller configured to determine whether said element is the general paging message and further configured to determine, when said element is not the general paging message, whether said element is of a type occurring only after the general paging message in said sequence,
    wherein said controller is further configured to transition said remote unit to an inactive mode when said element is of the type that occurs only after the general paging message.

12. The remote unit according to claim 11, wherein said controller is further configured to transition said remote unit to an inactive mode when said element is a general paging message.

13. A remote unit for use in a communication system, comprising:
    means for receiving an element of a sequence of messages in interleaved form during a slot assigned to the remote unit, the sequence of messages including a general paging message for transitioning a mode of operation of the remote unit to an inactive mode, said sequence being of a fixed order of element types;
    means for deinterleaving said element received in interleaved form;

means for determining whether said element is the general paging message;

means for further determining, when said element is not the general paging message, whether said element is of a type occurring only after the general paging message in said sequence; and means for transitioning said remote unit to an inactive mode when said element is of the type that occurs only after the general paging message.

14. A method of processing base station signals by a remote unit for use in a wireless communication system with base stations transmitting a sequence of messages in interleaved form, said sequence being of a fixed order of element types, said method comprising:

receiving an element of said sequence of messages during a slot assigned to the remote unit, the sequence of messages including a general paging message for transitioning a mode of operation of the remote unit to an inactive mode;

determining whether said element is the general paging message;

if said element is not the general paging message, further determining whether said element is of a type occurring only after the general paging message in said sequence; and changing a mode of operation of said remote unit to an inactive mode when said element is of the type that only occurs after the general paging message.

15. The method according to claim 14, wherein said remote unit transitions to an active mode prior to said receiving.

16. The method according to claim 14, further comprising:

changing a mode of operation of said remote unit when said element is a general paging message.

17. The method according to claim 14, further comprising:

transitioning said remote unit to an inactive mode when said element is a general paging message.

18. The method according to claim 14, further comprising:

transitioning said remote unit to an inactive mode when said element is of the type that only occurs after a general paging message.

* * * * *